United States Patent [19]

Turnbull

[11] Patent Number: 5,562,302
[45] Date of Patent: Oct. 8, 1996

[54] INFLATABLE VEHICLE OCCUPANT RESTRAINT

[75] Inventor: Roy C. Turnbull, Troy, Mich.

[73] Assignee: TRW Vehicle Safety Systems Inc., Lyndhurst, Ohio

[21] Appl. No.: 508,064

[22] Filed: Jul. 27, 1995

[51] Int. Cl.[6] .................................................. B60R 21/22
[52] U.S. Cl. ................................... 280/730.1; 280/743.1
[58] Field of Search ........................... 280/743.1, 730.1, 280/732, 728.1, 729

[56] References Cited

U.S. PATENT DOCUMENTS

| | | | |
|---|---|---|---|
| 3,642,303 | 2/1972 | Irish et al. | 280/150 AB |
| 3,819,204 | 6/1974 | Oka et al. | 280/150 AB |
| 4,169,613 | 10/1979 | Barnett | 280/732 |
| 4,186,941 | 2/1980 | Scholz et al. | 280/743.1 |
| 4,300,894 | 11/1981 | Cumming et al. | 280/729 X |
| 5,280,954 | 1/1994 | Hensler et al. | 280/743.1 |
| 5,322,326 | 6/1994 | Ohm | 280/743.1 X |
| 5,486,019 | 1/1996 | Chevroulet et al. | 280/743.1 X |

*Primary Examiner*—Kevin Hurley
*Assistant Examiner*—Jonathan Butts
*Attorney, Agent, or Firm*—Tarolli, Sundheim, Covell, Tummino & Szabo

[57] ABSTRACT

An air bag (10) includes a torso portion (120) for protecting the torso (180) of a vehicle occupant (16) and a head portion (130) for protecting the head (182) of the vehicle occupant from contact with the windshield (186) of the vehicle (14) due to relative movement of the head and the vehicle part in a first direction (188). The head portion (130) of the air bag (10) includes first and second fabric material panel portions (148, 150) which are sewn together at at least three predetermined locations (140) spaced apart across the width of the head portion. The first and second fabric material panel portions (148, 150) extend generally parallel to each other when inflated to provide the head portion (130) of the air bag (10) with a generally flat configuration. The head portion (130) of the air bag (10) is relatively thin as measured in the first direction (188) to minimize the amount of inflation fluid needed for inflation of the air bag.

16 Claims, 3 Drawing Sheets

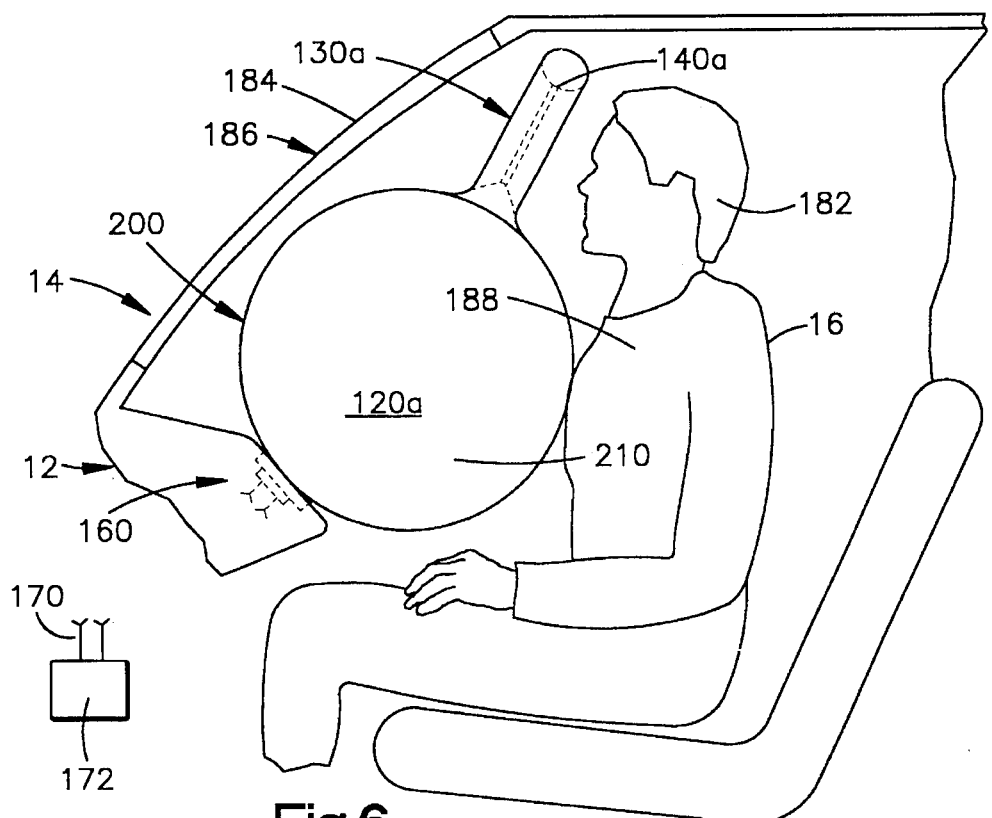
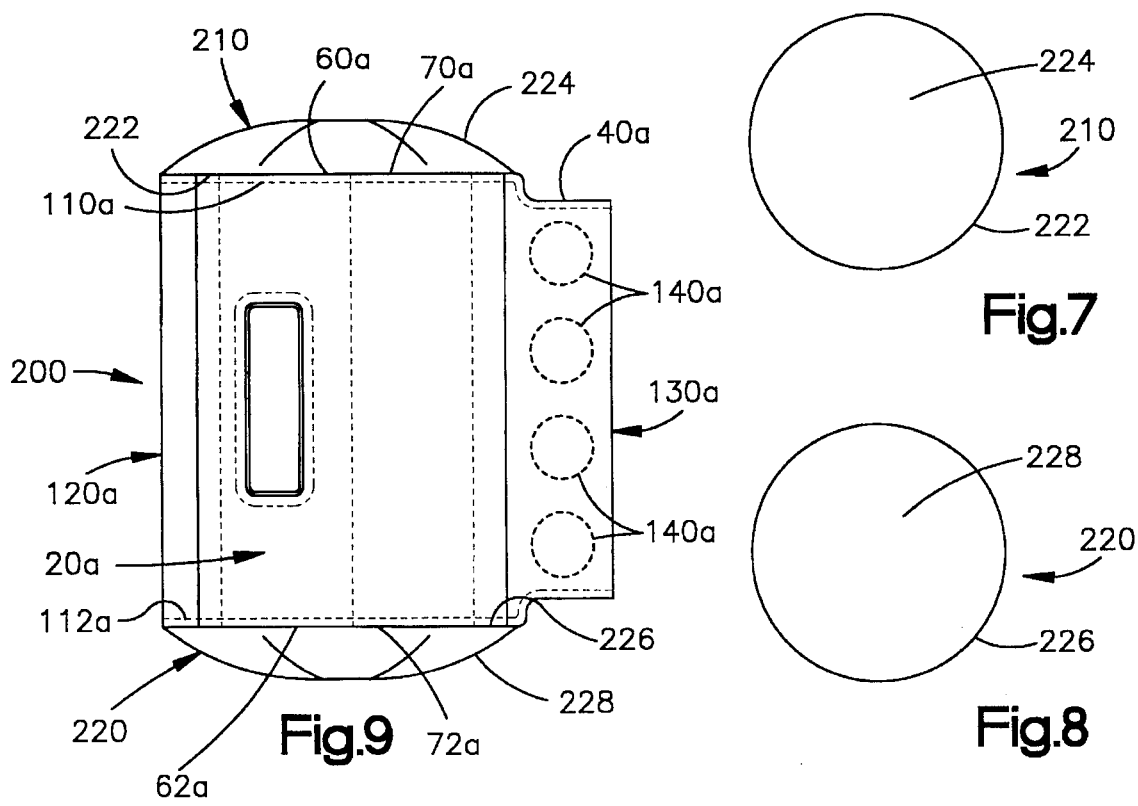

5,562,302

1

INFLATABLE VEHICLE OCCUPANT RESTRAINT

BACKGROUND OF THE INVENTION

1. Technical Field

The present invention relates to an inflatable vehicle occupant restraint, and is particularly directed to an air bag for protecting the torso and head of a vehicle occupant in the event of a vehicle collision.

2. Description of the Prior Art

A particular type of inflatable vehicle occupant restraint, typically referred to as an "air bag", is commonly used to protect a vehicle occupant in the event of sudden vehicle deceleration such as occurs in a vehicle collision. The air bag is inflated with inflation fluid into a position adjacent to the vehicle occupant to protect the vehicle occupant from forcefully striking parts of the vehicle. The inflation fluid is provided by an air bag inflator.

In a vehicle collision, the head of the vehicle occupant may be subject to injury from broken or flying glass from the vehicle windshield or side windows. It is desirable to protect the occupant from such broken or flying glass.

Also, an air bag which is designed to protect both the head and torso of a vehicle occupant can require substantially more inflation fluid than an air bag which is designed to protect only the torso of a vehicle occupant, thus requiring a larger inflator which is heavier and takes up more space in the vehicle. It is desirable, of course, to minimize the weight and dimensions of an inflator.

SUMMARY OF THE INVENTION

The present invention is an inflatable vehicle occupant restraint for protecting an occupant of a vehicle during a vehicle collision from contact with parts of the vehicle. The inflatable restraint has a deflated condition and an inflated, occupant protecting condition. The inflatable restraint is inflated from the deflated condition to the inflated condition by inflation fluid from an inflation fluid source. The inflated restraint includes a torso portion for protecting the torso of the vehicle occupant. The inflated restraint also includes a head portion for, when the inflatable restraint is in the inflated condition, protecting the head of the vehicle occupant from contact with a part of the vehicle due to relative movement of the head and the vehicle part in a first direction. The head portion of the inflatable restraint has a width extending generally transverse to the first direction. The head portion of the inflatable restraint includes first and second fabric material panel portions which are sewn together at least at three predetermined locations spaced apart across the width of the head portion of said inflatable restraint. This reduces the volume of the head portion, thus minimizing the weight and dimension of the inflator.

In a preferred embodiment, the fabric material panel portions extend generally parallel to each other when the inflatable restraint is in the inflated condition to provide the head portion of the inflatable restraint with a generally flat configuration. The head portion of the inflatable restraint is designed to overlie a vehicle window to provide a barrier against glass contacting the occupant.

BRIEF DESCRIPTION OF THE DRAWINGS

Further features of the present invention will become apparent to those skilled in the art to which the present invention relates from reading the following specification with reference to the accompanying drawings, in which:

FIG. 6 is a schematic side view of an air bag constructed in accordance with a second embodiment of the present invention shown in an inflated, occupant protecting condition;

FIG. 7 is a view of an inner side panel which forms a portion of the air bag of FIG. 6;

FIG. 8 is a view of an outer side panel which forms a portion of the air bag of FIG. 6; and FIG. 9 is a view similar to FIG. 3 of the air bag of FIG. 6.

DESCRIPTION OF PREFERRED EMBODIMENTS

Figures 1, 2:
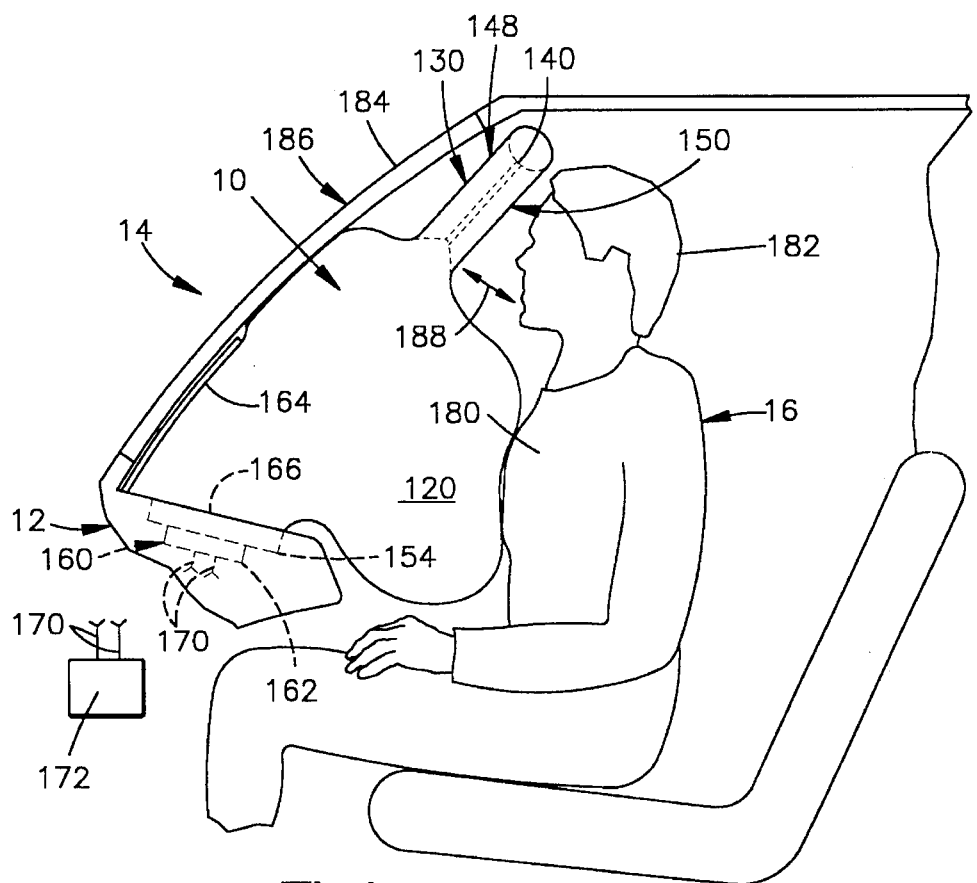
FIG. 1 is a schematic side view of an air bag constructed in accordance with the present invention shown in an inflated, occupant protecting condition.
FIG. 2 is a plan view of a panel of fabric material in a condition prior to being folded and sewn to make the air bag of FIG. 1.

The present invention relates to a vehicle occupant restraint which is inflatable to help protect an occupant of a vehicle. The present invention is applicable to various inflatable restraint constructions. As representative of the present invention, FIG. 1 illustrates a specific inflatable vehicle occupant restraint 10, commonly known as an "air bag". The air bag 10 is illustrated as being inflatable from an instrument panel 12 of a vehicle 14 to help protect an occupant 16 of the vehicle from contact with parts of the vehicle. The air bag could be inflatable from any desired part of the vehicle.

The air bag 10 (FIG. 2) is made from a single panel 20 of fabric material, preferably woven nylon, which is folded and sewn to form the air bag. The panel 20 (FIG. 2) is generally rectangular in configuration and has a longitudinal central axis 22. A transverse axis 24 of the panel 20 extends perpendicular to the longitudinal axis 22.

The panel 20 has a first end portion 30 and a second end portion 32, which are disposed on opposite sides of the transverse axis 24. The transverse axis extends through an intermediate portion 34 of the panel 20 which is disposed between the end portions 30 and 32. The panel 20 also has left and right side portions 36 and 38, which are disposed on opposite sides of (above and below as viewed in FIG. 2) the longitudinal axis 22 and which include left and right side portions respectively of the first and second end portions 30 and 32 and the intermediate portion 34.

The intermediate portion 34 of the panel 20 is defined generally by two recessed side edge portions 40 and 42 of the panel and by two imaginary lines 44 and 46 which extend parallel to the transverse axis 24 of the panel. A first section 48 of the intermediate portion 34 is disposed between the transverse axis 24 and the one imaginary line 44, that is, to the left of the transverse axis as viewed in FIG. 2. A second section 50 of the intermediate portion 34 is disposed between the transverse axis 24 and the other imaginary line 46, that is, to the right of the transverse axis as viewed in FIG. 2.

The first end portion 30 of the panel 20 extends to the left of the intermediate portion 34 (as viewed in FIG. 2). The first end portion 30 is defined generally by side edge portions 60 and 62 of the panel 20, which extend parallel to the longitudinal axis 22, and by an end edge 64 of the panel, which extends between and interconnects the side edge portions 60 and 62. An elongate inflation fluid opening 66 is formed in the first end portion 30 of the panel 20, at a location adjacent to the first end edge 64.

The second end portion 32 of the panel 20 extends to the right of the intermediate portion 34 as viewed in FIG. 2. The second end portion 32 is defined generally by side edge portions 70 and 72 of the panel 20, which extend parallel to the longitudinal axis 22, and by an end edge 74, which extends between and interconnects the side edge portions 70 and 72. An elongate inflation fluid opening 76 is formed in the second end portion 32 of the panel 20, at a location adjacent to the second end edge 74. The inflation fluid opening 76 in the second end portion 32 of the panel 20 is identical in configuration to the inflation fluid opening 66 in the first end portion 30 of the panel. The inflation fluid openings 66 and 76 are centered on the longitudinal axis 22 of the panel 20.

Figure 3:
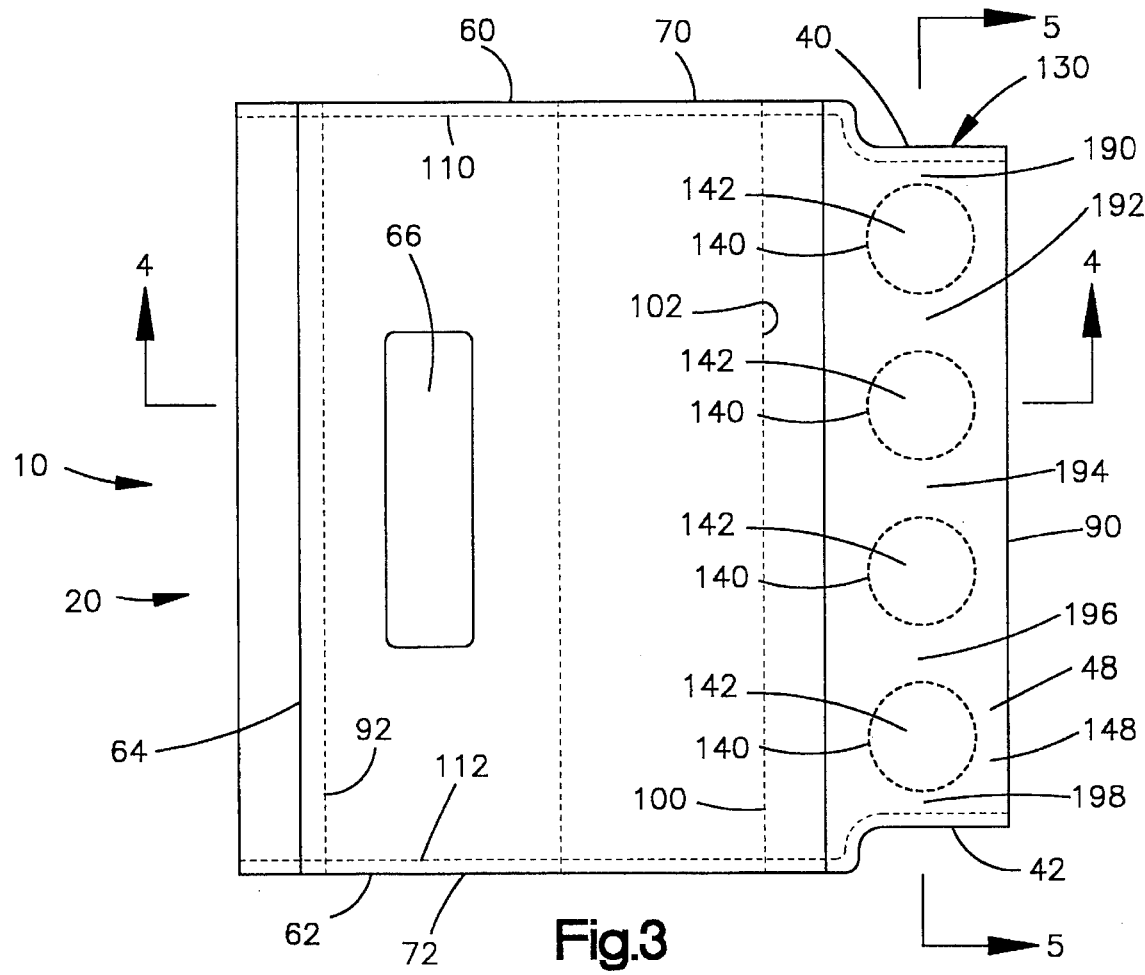
FIG. 3 is a plan view of the air bag of FIG. 1 in a deflated condition.
Figure 4:
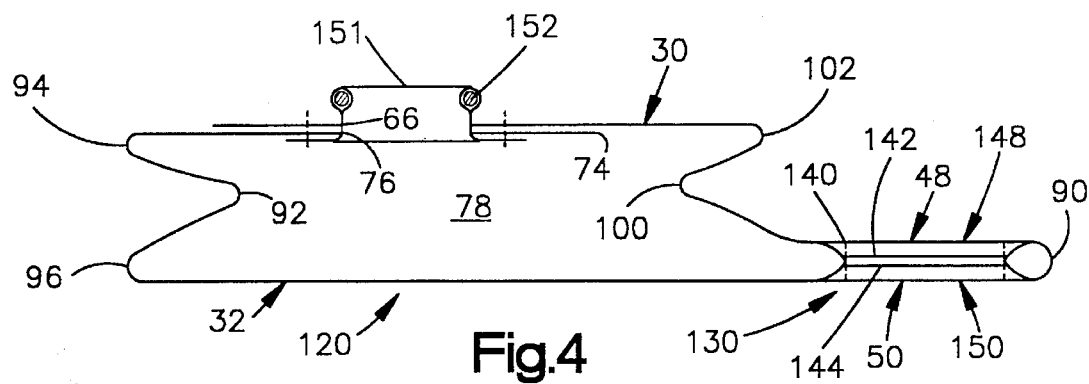
FIG. 4 is a schematic sectional view of the air bag of FIG. 1 taken along line 4—4 of FIG. 3.
Figure 5:
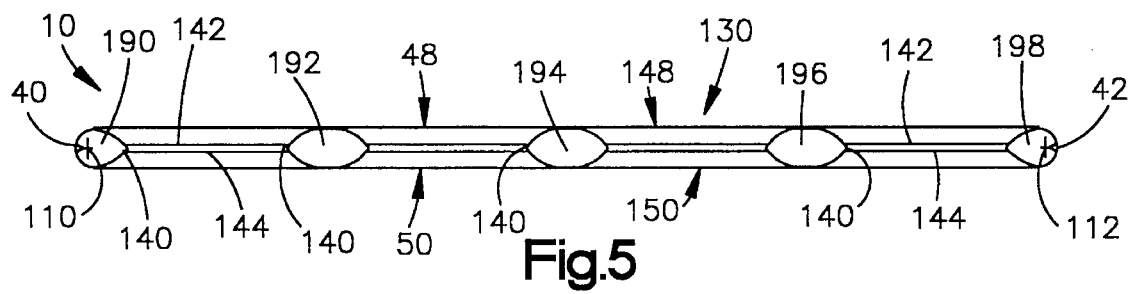
FIG. 5 is a schematic sectional view of the air bag of FIG. 1 taken along line 5—5 of FIG. 3.

The inflation fluid openings 66 and 76 communicate with an inflation fluid volume 78 (FIG. 4) which is formed when the panel 20 is folded and sewn to make the air bag 10. FIGS. 3–5 illustrate schematically the condition of the panel 20 after the process of folding and sewing the panel to make the air bag 10. It should be understood that at least some of the steps in the process of folding and sewing the panel 20 to make the air bag 10 are performed when the air bag is in an "inside out" condition, to place some seams and panel edges inside the finished air bag after it is inverted or turned "right side out".

The panel 20 is folded along a fold line 90 which is coincident with the transverse axis 24. As a result, the first section 48 of the intermediate portion 34 of the panel 20 overlies the second section 50 of the intermediate portion of the panel. The first end portion 30 of the panel 20 overlies the second end portion 32. (In FIG. 4, the end portions 30 and 32 are shown spaced apart for clarity.) The inflation fluid opening 66 in the first end portion 30 of the panel 20 is aligned with and overlies the inflation fluid opening 76 in the second end portion 32 of the panel.

The panel 20 is also folded along a fold line 92 which extends parallel to the fold line 90. The material of the panel 20 at the fold line 92 is moved into the space inside the folded panel. A part of the first end portion 32 of the panel 20 is thus tucked inward toward the inflation fluid openings 66 and 76, in a manner as seen in FIG. 4. This forms two additional fold lines or tuck lines 94 and 96. In a similar manner, a part of the first end portion 30 of the panel 20, at a fold line 100, is moved into the space inside the folded panel. This forms an additional fold line or tuck line 102.

The panel 20 as thus folded is sewn along its side edges with side stitching lines 110 and 112. The end portions 30 and 32 of the panel 20, when sewn together in this manner, form a torso portion 120 of the air bag 10.

The intermediate portion 34 of the panel 20 is then sewn at a series of predetermined locations which are spaced apart across the width (from top to bottom as viewed in FIG. 3, or right to left as viewed in FIG. 5) of the air bag. The intermediate portion 34 of the panel 20, as thus sewn, forms a head portion 130 of the air bag 10. The first and second sections 48 and 50 of the intermediate portion 34 of the panel 20 form first and second sections 148 and 150 of the head portion 130 of the air bag 10.

A portion of the side stitching line 110 (FIG. 3) extends along the one side edge portion 40 of the intermediate portion 34 of the panel 20 and joins the first section 148 and the second section 150 of the head portion 130 of the air bag. A portion of the other side stitching line 112 extends along the other side edge portion 42 of the intermediate portion 34 of the panel 20 and joins the first section 148 and the second section 150 of the head portion 130 of the air bag.

A series of circular stitching sections 140 extend through the first section 148 and the second section 150 of the head portion 130 of the air bag 10 at predetermined locations across the width of the air bag. Each one of the stitching sections 140 is spaced apart from the other stitching sections 140. Also, each one of the stitching sections 140 is spaced apart from the side stitching lines 110 and 112 of the air bag 10.

Each stitching section 140 includes a series of stitches arranged in a circular pattern which extend through the first section 148 and the second section 150 of the head portion 130 of the air bag 10. (It should be understood that the stitching sections 140 could have a closed configuration other than circular, such as an oval or elliptical configuration.) Each stitching section 140 encloses and defines a circular portion 142 of the first section 148 of the head portion 130. Each stitching section 140 similarly encloses and defines a circular portion 144 of the second section 150 of the head portion 130.

Each circular portion 142 of the first section 148 overlies and is in abutting engagement with an associated circular portion 144 of the second section 150. (In FIGS. 4 and 5, the circular portions 142 and 144 are, for clarity, shown spaced apart from each other.) The circular stitching sections 140, because they are closed, block the flow of inflation fluid from the inflation fluid volume 78 to a location between the circular portions 142 of the first section 148 and the circular portions 144 of the second section 150.

A tubular attachment panel 151 (FIG. 4) and a retaining ring 152 are connected with the panel 20 in a known manner. The attachment panel 151 encircles the retaining ring 152 and secures the retaining ring to the panel 20. The assembled air bag 10 is thereafter folded in a known manner (not shown) and mounted in the instrument panel 12 (FIG. 1) of the vehicle 16 as a portion of an air bag module indicated schematically at 160. The module 160 includes, in addition to the air bag 10, an inflator indicated schematically at 162. A cover 164 closes an opening 166 in the instrument panel 12 through which the air bag 10 is inflatable. The cover 164, shown in an open position in FIG. 1, is preferably made of a suitable plastic and may form a portion of the vehicle instrument panel 12.

The inflator 162 is connected by lead wires 170 with known electric circuitry of the vehicle indicated schematically at 172 which includes a power source, such as the vehicle battery, and a deceleration sensor. In the event of a vehicle emergency situation, such as sudden vehicle deceleration, which requires inflation of the air bag 10 to help protect the vehicle occupant 16, the deceleration sensor in the vehicle electric circuitry 172 causes electric current to be supplied over the lead wires 170 to the inflator 162. The inflator 162 is actuated, in a known manner, to direct inflation fluid through the inflation fluid openings 66 and 76 into the inflation fluid volume 78 in the air bag 10. The air bag 10 inflates to the condition illustrated schematically in FIG. 1 in which the torso portion 120 of the air bag 10 is generally in position in front of the upper torso 180 of the vehicle occupant 16.

The sudden deceleration of the vehicle 14 typically results in relative movement between the head 182 of the vehicle occupant 16 and the vehicle windshield 186, in a first direction as indicated by the arrow 188. To help protect the vehicle occupant 16, the head portion 130 of the air bag 10 is disposed between the head 182 of the vehicle occupant and an upper portion 184 of the windshield 186 of the vehicle 14. The inflated head portion 130 of the air bag 10 extends in a direction transverse to the first direction 188— i.e., into the paper as viewed in FIG. 1, or from top to bottom as viewed in FIG. 3. The head portion 130 of the air bag 10 has a generally flat configuration and extends generally radially outward from the torso portion 120 of the air bag.

The inflated head portion 130 of the air bag 10 prevents contact between the head 182 of the vehicle occupant 16 and the windshield 186 of the vehicle 14. Specifically, the windshield of a vehicle involved in a collision, such as the windshield 186, may crack or break apart in the vehicle collision. The inflated head portion 130 of the air bag 10 prevents broken or flying glass from the windshield 186 from contacting the head 182 of the vehicle occupant 16. Also, the inflated head portion 130 of the air bag 10 prevents the head 182 of the vehicle occupant 16 from moving forward in the vehicle 14 far enough to contact the windshield 186. Thus, the head portion 130 of the air bag 10 prevents the vehicle occupant from receiving facial or scalp lacerations from broken or flying glass of the vehicle windshield 186.

As the air bag 10 including the head portion 130 assumes the inflated condition, the pressure of the inflation fluid in the inflation fluid volume 78 causes the first section 148 and the second section 150 of the head portion of the air bag to move away from each other. The fluid pressure between the first and second sections 148 and 150 places a tensile load on the stitching sections 140 in a direction extending between the first section 148 and the second section 150. The circular stitching sections 140 and the side stitching lines 110 and 112 resist movement of the first and second sections 148 and 150 away from each other. The stitching sections 140 do not extend. The stitching sections 140 limit and define the thickness or inflated dimension of the head portion 130 of the air bag 10 as measured between the first section 148 and the second section 150. The stitching sections 140 act as tethers for controlling the shape of the head portion 130 of the air bag 10 when inflated, by controlling the distance between the first and second sections 148 and 150 of the head portion of the air bag.

The thickness of the inflated head portion 130 of the air bag 10, at the location of the stitching sections 140, is effectively zero. That is, there is only a minimal, insignificant amount of inflation fluid between the circular portions 142 of the first section 148 of the head portion 130 and circular portions 144 of the second section 150 of the head portion. Also, the thickness of the head portion 130 of the air bag 10 at the outer stitching lines 110 and 112, when the air bag is inflated, is effectively zero because the first section 148 and the second section 150 are sewn together in abutting engagement at the stitching lines 110 and 112. Because the thickness of the head portion 130 of the air bag 10 is limited in the direction 188, only a relatively small amount of inflation fluid is needed to inflate the head portion of the air bag. This can help to minimize the size of the inflator 162 which is needed to inflate the air bag 10.

At other locations on the head portion 130 of the air bag 10, the air bag has a measurable and substantial thickness. That is, at these other locations, the first section 148 and the second section 150 are held apart from each other by the pressure of the inflation fluid between them. The head portion 130 of the air bag 10, when in this inflated condition, includes an interconnected series of sections 190, 192, 194, 196, and 198 (best seen in FIG. 5) of the single inflation fluid volume 78. Each one of these inflation fluid sections 190–198 attempts to assume a spherical shape as the inflation fluid forces apart the first section 148 and the second section 150. Overall, the first section 148 and the second section 150 of the head portion 130 of the air bag 10 extend generally parallel to each other when the air bag is in the inflated condition to provide the head portion of the air bag with a generally flat configuration.

As illustrated in FIGS. 1–5, the air bag 10 is a "pillow" bag configuration which is mounted in the vehicle 14 in a top mount configuration. It should be understood that the present invention is applicable to other air bag and mounting configurations as well.

For example, FIG. 6 illustrates an air bag 200 which is constructed in accordance with a second embodiment of the present invention. The air bag 200 has a cylindrical configuration rather than the pillow-shaped configuration of the air bag 10 (FIGS. 1–5). Since the embodiment of the invention illustrated in FIGS. 6–9 is similar to the embodiment of the invention illustrated in FIGS. 1–5, similar reference numerals are used to designate similar components, the suffix letter "a" being associated with the reference numerals of FIGS. 6–9 to avoid confusion. Parts of the vehicle which are the same in both embodiments are given the same reference numerals.

The air bag 200 (FIGS. 6 and 9) includes a main panel 20a which is identical to the panel 20 (FIGS. 1–5) of the air bag 10. In addition, the air bag 200 includes inner and outer side panels 210 and 220.

The inner side panel 210 is made from a single piece of fabric material, preferably the same material as the main panel 20a. The inner side panel 210 has a circular configuration as defined by a circular outer periphery 222. The inner side panel 210 has an outer side surface 224 and an opposite inner side surface (not shown).

The outer side panel 220 is identical to the inner side panel 210. The outer side panel 210 is made from a single piece of fabric material and has a circular configuration as defined by a circular outer periphery 226. The outer side panel 210 also has an outer side surface 228 and an opposite inner side surface (not shown).

In the process of making the air bag 200, the main panel 20a is sewn together with the side panels 210 and 220 in a manner as shown schematically in FIG. 9. The side stitching line 110a joins the outer periphery 222 of the inner side panel 210 to the side edge of the main panel 20a including the side edge portions 60a and 70a. The side stitching line 112a joins the outer periphery 226 of the outer side panel 220 to the side edge of the main panel 20a including the side edge portions 62a and 72a. As a result, the completed air bag 200 (FIGS. 6 and 9), when inflated, has a cylindrical configuration rather than the pillow-shaped configuration of the air bag 10 illustrated in FIGS. 1–5. When the air bag 200 is inflated as shown schematically in FIG. 6, the head portion 130a of the air bag inflates into a position to protect the head 182 of the vehicle occupant 16.

In one air bag 200 which has been constructed in accordance with the second embodiment of the invention, the torso portion 120a of the air bag has a diameter, when inflated, of about 500 mm to 650 mm. The head portion 130a of the air bag 200 extends for about 200 mm to 250 mm, from the torso portion 120a of the air bag. The head portion 130a of the air bag 200 has a thickness (as measured in the direction 188) of about 50 mm to about 100 mm.

From the above description of the invention, those skilled in the art will perceive improvements, changes and modifications in the invention. For example, an air bag constructed in accordance with the present invention can be used to protect a vehicle occupant against injury from a vehicle window other than the windshield. A side impact air bag, as an example, can be used to prevent contact between the vehicle occupant and a side window of a vehicle. Also, the head portion of the air bag could be formed as a separate piece of fabric material which is sewn onto the torso portion over a row of vents. Such improvements, changes and modifications within the skill of the art are intended to be covered by the appended claims.

Having described the invention, I claim:

1. An inflatable vehicle occupant restraint for protecting an occupant of a vehicle during a vehicle collision from contact with parts of the vehicle, said inflatable restraint having a deflated condition and an inflated, occupant protecting condition, said inflatable restraint being inflatable from the deflated condition to the inflated condition by inflation fluid from an inflation fluid source, said inflatable restraint comprising:

a torso portion for protecting the torso of the vehicle occupant when said inflatable restraint is in the inflated condition; and a head portion for, when said inflatable restraint is in the inflated condition, protecting the head of the vehicle occupant from contact with a part of the vehicle due to relative movement of the head and the vehicle part in a first direction;

said head portion of said inflatable restraint having a width extending generally transverse to the first direction;

said head portion of said inflatable restraint comprising first and second fabric material panel portions which are sewn together at at least three predetermined locations spaced apart across the width of said head portion of said inflatable restraint.

2. An inflatable restraint as set forth in claim 1 wherein said first and second fabric material portions are sewn together with a plurality of spaced apart stitching sections which limit the amount of relative movement of said first and second fabric material portions away from each other in the first direction thereby to limit the thickness in the first direction of said head portion when inflated.

3. An inflatable restraint as set forth in claim 2 wherein said inflatable restraint defines an inflation fluid volume into which inflation fluid from the inflation fluid source flows to inflate said inflatable restraint, said inflation fluid volume comprising a part of said inflation fluid volume which extends around said stitching sections between said first and second fabric material portions.

4. An inflatable restraint as set forth in claim 1 wherein said first and second fabric material portions are formed as one piece with said torso portion of said inflatable restraint.

5. An inflatable restraint as set forth in claim 1 including at least one circular stitching section extending between said first and second fabric material portions, said circular stitching section defining a first circular portion of said first fabric material portion and a second circular portion of said second fabric material portion, said circular stitching section blocking the flow of inflation fluid from said inflation fluid source between said first and second circular portions.

6. An inflatable restraint as set forth in claim 1 wherein said first and second fabric material panel portions extend generally parallel to each other when said inflatable restraint is in the inflated condition to provide said head portion of said inflatable restraint with a generally flat configuration.

7. An inflatable restraint as set forth in claim 6 wherein said torso portion of said inflatable restraint has a cylindrical or pillow-shaped configuration.

8. An inflatable restraint as set forth in claim 1 wherein each one of said stitching sections includes a plurality of stitches extending in said first direction between said first and second fabric material portions.

9. An inflatable restraint as set forth in claim 1 wherein at each one of said at least three predetermined locations said first and second fabric material panel portions are sewn together with a closed non-linear stitching section which extends through said first and second fabric material portions, each one of said closed non-linear stitching sections enclosing and defining a respective first closed portion of said first fabric material portion and a corresponding respective second closed portion of said second fabric material portion which overlies in abutting engagement said corresponding respective first closed portion of said second fabric material portion, said closed stitching sections blocking the flow of inflation fluid from the inflation fluid source between said first and second closed portions of said first and second fabric material portions.

10. An inflatable vehicle occupant restraint for protecting an occupant of a vehicle during a vehicle collision, said inflatable restraint having a deflated condition and an inflated, occupant protecting condition, said inflatable restraint comprising:

a torso portion for protecting the torso of the vehicle occupant when said inflatable restraint is in the inflated condition; and a head portion for protecting the head of the vehicle occupant from contact with broken glass from a vehicle window when said inflatable restraint is in the inflated condition, said head portion being inflatable into a position between the window and the occupant's head, said head portion having a width extending generally transverse to a first direction which comprises the direction of relative movement between the occupant's head and the window during a vehicle collision;

said head portion of said inflatable restraint comprising first and second fabric material panel portions which are sewn together at at least three predetermined locations spaced apart across the width of said head portion of said inflatable restraint.

11. An inflatable restraint as set forth in claim 10 wherein at each one of said at least three predetermined locations said first and second fabric material panel portions are sewn together with a closed non-linear stitching section which extends through said first and second fabric material portions, each one of said closed non-linear stitching sections enclosing and defining a respective first closed portion of said first fabric material portion and a corresponding respective second closed portion of said second fabric material portion which overlies in abutting engagement said corresponding respective first closed portion of said second fabric material portion, said closed stitching sections blocking the flow of inflation fluid from the inflation fluid source between said first and second closed portions of said first and second fabric material portions.

12. An inflatable restraint as set forth in claim 11 wherein each one of said closed non-linear stitching sections has a circular configuration.

13. An inflatable restraint as set forth in claim 10 wherein said torso portion of said inflatable restraint has a generally cylindrical configuration and said head portion has a generally flat configuration extending radially outward from said torso portion.

14. An inflatable restraint as set forth in claim 10 wherein said torso portion of said inflatable restraint has a generally pillow-shaped configuration and said head portion has a generally flat configuration extending radially outward from said torso portion.

15. An inflatable vehicle occupant restraint for protecting an occupant of a vehicle from contact with parts of the vehicle during vehicle deceleration above a predetermined deceleration, said inflatable restraint having a deflated condition and an inflated, occupant protecting condition, said inflatable restraint comprising:

a torso portion for protecting the torso of the vehicle occupant when said inflatable restraint is in the inflated condition; and a head portion for location between the head of the vehicle occupant and the parts of the vehicle when said inflatable restraint is in the inflated condition;

said head portion of said inflatable restraint comprising first and second fabric material panel portions which are sewn together at predetermined locations and which extend generally parallel to each other when said inflatable restraint is in the inflated condition to provide said head portion of said inflatable restraint with a generally flat configuration.

16. An inflatable restraint as set forth in claim 15 wherein at each one of said predetermined locations said first and second fabric material panel portions are sewn together with a closed non-linear stitching section which extends through said first and second fabric material portions, each one of said closed non-linear stitching sections enclosing and defining a respective first closed portion of said first fabric material portion and a corresponding respective second closed portion of said second fabric material portion which overlies in abutting engagement said corresponding respective first closed portion of said second fabric material portion, said closed stitching sections blocking the flow of inflation fluid from the inflation fluid source between said first and second closed portions of said first and second fabric material portions.

* * * * *